United States Patent
Huang et al.

(10) Patent No.: US 11,964,811 B2
(45) Date of Patent: Apr. 23, 2024

(54) LIQUID STORAGE TANK

(71) Applicant: DELTA ELECTRONICS, INC., Taoyuan (TW)

(72) Inventors: Yu-Jei Huang, Taoyuan (TW); Wei-Fang Wu, Taoyuan (TW); Chia-Ying Hsu, Taoyuan (TW); Chih-Chieh Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/808,106

(22) Filed: Jun. 21, 2022

(65) Prior Publication Data
US 2022/0315315 A1 Oct. 6, 2022

Related U.S. Application Data

(63) Continuation of application No. 16/726,966, filed on Dec. 26, 2019.

(60) Provisional application No. 62/878,576, filed on Jul. 25, 2019.

(51) Int. Cl.
*B65D 83/00* (2006.01)
*B65D 6/40* (2006.01)
*B65D 8/00* (2006.01)

(52) U.S. Cl.
CPC .......... *B65D 83/0038* (2013.01); *B65D 7/40* (2013.01); *B65D 7/04* (2013.01); *B65D 2205/02* (2013.01)

(58) Field of Classification Search
CPC .......... F15B 1/04; F15B 1/24; F15B 2201/21; F15B 2201/31; B65D 83/0038; B65D 83/0022; B65D 83/0005
See application file for complete search history.

(56) References Cited

U.S. PATENT DOCUMENTS

| | | |
|---|---|---|
| 1,861,154 A | 5/1932 | Dorman |
| 2,175,121 A | 10/1939 | Katz et al. |
| 4,389,984 A | 6/1983 | Destrampe |
| 5,205,326 A | 4/1993 | Paley et al. |
| 5,353,840 A | 10/1994 | Paley et al. |
| 6,267,147 B1 | 7/2001 | Rago |
| 6,295,813 B1 | 10/2001 | Stenquist |
| 6,390,133 B1 | 5/2002 | Patterson et al. |
| 6,394,418 B1 | 5/2002 | Duan et al. |
| 2005/0178526 A1 | 8/2005 | Naganawa et al. |
| 2007/0220881 A1 | 9/2007 | Komaki et al. |

(Continued)

FOREIGN PATENT DOCUMENTS

| | | |
|---|---|---|
| CN | 2328815 Y | 7/1999 |
| CN | 1658119 A | 8/2005 |

(Continued)

*Primary Examiner* — Reinaldo Sanchez-Medina
*Assistant Examiner* — Nicole Gardner
(74) *Attorney, Agent, or Firm* — CKC & Partners Co., LLC

(57) ABSTRACT

A liquid storage tank includes a housing, a piston located in the housing, a cover, an elastic element, and an outlet pipe. The cover is attached to the housing and has a support post extending toward the piston. The piston, the housing, and the cover define a tank chamber. The tank chamber is filled with cooling liquid. The elastic element is connected with the tank hosing and the piston. The elastic element is free from contact with the cooling liquid. The outlet pipe communicates with the tank chamber. An extension direction of an opening of the outlet pipe is not parallel to a direction of movement of the elastic element. When the cooling liquid is decreased, the piston compressed the tank chamber such that the elastic element is released. The tank chamber is continuously compressed by pairing the elastic element and the piston.

17 Claims, 11 Drawing Sheets

(56) References Cited

U.S. PATENT DOCUMENTS

| | | | |
|---|---|---|---|
| 2012/0085451 A1* | 4/2012 | Poskie | F15B 1/04 138/31 |
| 2015/0337869 A1* | 11/2015 | Pekarsky | F16J 15/16 92/60 |
| 2015/0361648 A1* | 12/2015 | Boodaghians | F15B 1/04 4/354 |
| 2017/0009773 A1 | 1/2017 | Marenco et al. | |
| 2019/0337500 A1* | 11/2019 | Schlitzkus | F15B 1/02 |

FOREIGN PATENT DOCUMENTS

| | | |
|---|---|---|
| CN | 1997827 A | 7/2007 |
| CN | 101122302 A | 2/2008 |
| CN | 101144482 A | 3/2008 |
| CN | 203546854 U | 4/2014 |
| CN | 204187069 U | 3/2015 |
| CN | 106304753 A | 1/2017 |
| CN | 107013467 A | 8/2017 |
| CN | 107013469 A | 8/2017 |
| CN | 109253574 A | 1/2019 |
| CN | 109923315 A | 6/2019 |
| DE | 102015106945 A1 | 11/2015 |
| GB | 833857 A | 5/1960 |
| TW | 200811371 A | 3/2008 |
| TW | 200815677 A | 4/2008 |
| TW | M500843 U | 5/2015 |
| TW | M517792 U | 2/2016 |
| TW | 201727081 A | 8/2017 |
| TW | M562420 U | 6/2018 |

\* cited by examiner

LIQUID STORAGE TANK

CROSS-REFERENCE TO RELATED APPLICATION

This application is a continuation application of U.S. application Ser. No. 16/726,966, filed Dec. 26, 2019, which claims priority to U.S. Provisional Application Ser. No. 62/878,576, filed Jul. 25, 2019, the entirety of which is incorporated by reference herein in their entireties.

BACKGROUND

Field of Invention

The present invention relates to a liquid storage tank. More particularly, the present invention relates to a liquid storage tank used in a cooling system.

Description of Related Art

The conventional cooling system employed a passive supplement method. Therefore, when the liquid storage tank is set at different orientations, it is necessary to set the outlet pipe at a location in a center of the liquid storage tank to ensure that the coolant can flow out from the outlet pipe.

Furthermore, due to the position of the outlet pipe is located at the center of the liquid storage tank, the liquid supplement device that may fail to supplement the coolant when the volume of the coolant is less than half of the volume of the tank. As a result, the pump may fail to pump the coolant and the cooling system idle.

Accordingly, how to overcome the limitation of the setting orientation, the position of the outlet and increase the available volume of the coolant becomes an important issue to be solved.

SUMMARY

One aspect of the present disclosure is a liquid storage tank.

In some embodiments, the liquid storage tank includes a housing, a piston located in the housing, a lower cover, an elastic element, and an outlet pipe. The lower cover is attached to the housing and has a support post extending toward the piston. The piston, the housing, and the lower cover define a tank chamber. The tank chamber is filled with cooling liquid. The elastic element is connected with the tank hosing and the piston. The elastic element is free from contact with the cooling liquid. The outlet pipe communicates with the tank chamber. An extension direction of an opening of the outlet pipe is not parallel to a direction of movement of the elastic element. When the cooling liquid is decreased, the piston compressed the tank chamber such that the elastic element is released. The tank chamber is continuously compressed by pairing the elastic element and the piston.

In some embodiments, a length of the support post is greater than a distance between the outlet pipe and the cover.

In some embodiments, the housing further includes a column, the piston further includes a rod, and two ends of the elastic element are connected with the column and the rod, respectively.

In some embodiments, the liquid storage tank further includes an inlet pipe communicating with the tank chamber.

In some embodiments, the housing further includes an upper portion opposite to the cover, and the upper portion has an air vent therein.

In some embodiments, the cover and the housing each includes a screw thread, and the two screw threads are engaged with each other.

In some embodiments, the liquid storage tank further includes an o ring surrounding the piston and located between the housing and the piston.

Another aspect of the present disclosure is a liquid storage tank.

In some embodiments, the liquid storage tank includes a housing, a piston, a cover, an elastic element, and an outlet pipe. The cover is attached to the housing. The piston is in the housing and includes a support post that extends toward the cover. The piston, the housing, and the cover define a tank chamber. The tank chamber is filled with cooling liquid. The elastic element is connected with the housing and the piston. The elastic element is free from contact with the cooling liquid. The outlet pipe communicates with the tank chamber. An extension direction of an opening of the outlet pipe is not parallel to a direction of movement of the elastic element. When the cooling liquid is decreased, the piston compressed the tank chamber such that the elastic element is released. The tank chamber is continuously compressed by pairing the elastic element and the piston.

In some embodiments, the outlet pipe is connected with a sidewall of the housing.

In some embodiments, a length of the support post is greater than a distance between the outlet pipe and the cover.

In some embodiments, the outlet pipe is connected with the cover.

In some embodiments, the cover and the housing each includes a screw thread, and the two screw threads are engaged with each other.

In some embodiments, the liquid storage tank further includes a retaining element passing through the cover and fixed to the housing.

Another aspect of the present disclosure is a liquid storage tank.

In some embodiments, the liquid storage tank includes a housing, a piston, a cover, a piston, an elastic element, and an outlet pipe. The housing includes a protrusion. The cover is attached to the housing. The piston is in the housing. The piston, the housing, and the cover define a tank chamber. The tank chamber is filled with cooling liquid. The elastic element is connected with the housing and the piston, and the elastic element is free from contact with the cooling liquid. The outlet pipe communicates with the tank chamber. An extension direction of an opening of the outlet pipe is not parallel to a direction of movement of the elastic element. When the cooling liquid is decreased, the piston compressed the tank chamber such that the elastic element is released. The tank chamber is continuously compressed by pairing the elastic element and the piston.

In some embodiments, a distance between the protrusion and the cover is greater than a distance between the cover and the outlet pipe.

In some embodiments, the cover and the housing each comprises a screw thread, and the two screw threads are engaged with each other.

In some embodiments, the liquid storage tank further includes a retaining element passing through the cover and fixed to the housing.

Another aspect of the present disclosure is a liquid storage tank.

In some embodiments, the liquid storage tank includes a housing, a piston, a cover, a piston, an elastic element, and an outlet pipe. The cover is attached to the housing. The piston is in the housing. The piston, the housing, and the cover define a tank chamber. The tank chamber is filled with cooling liquid. The elastic element is connected with the housing and the piston, and the elastic element is free from contact with the cooling liquid. The outlet pipe communicates with the tank chamber. When the elastic element is not compressed, a distance between the piston and the cover is greater than a distance between the cover and the outlet pipe. An extension direction of an opening of the outlet pipe is not parallel to a direction of movement of the elastic element. When the cooling liquid is decreased, the piston compressed the tank chamber such that the elastic element is released. The tank chamber is continuously compressed by pairing the elastic element and the piston.

In some embodiments, the housing further includes a column, the piston further includes a rod, and two ends of the elastic element are connected with the column and the rod, respectively.

In some embodiments, the cover and the housing each includes a screw thread, and the two screw threads are engaged with each other.

In the aforementioned embodiments, by pairing the elastic element and the piston so as to continuously compress the tank chamber, the coolant can be keep at a side close to the outlet pipe. In other words, the liquid storage tank of the present disclosure can supplement the coolant automatically. Thus, the setting orientation of the liquid storage tank will not be limited. Furthermore, the liquid storage tank of the present disclosure can increase the available volume of the coolant in the liquid storage tank, such that it is not necessary to set the outlet pipe in a center of the housing.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
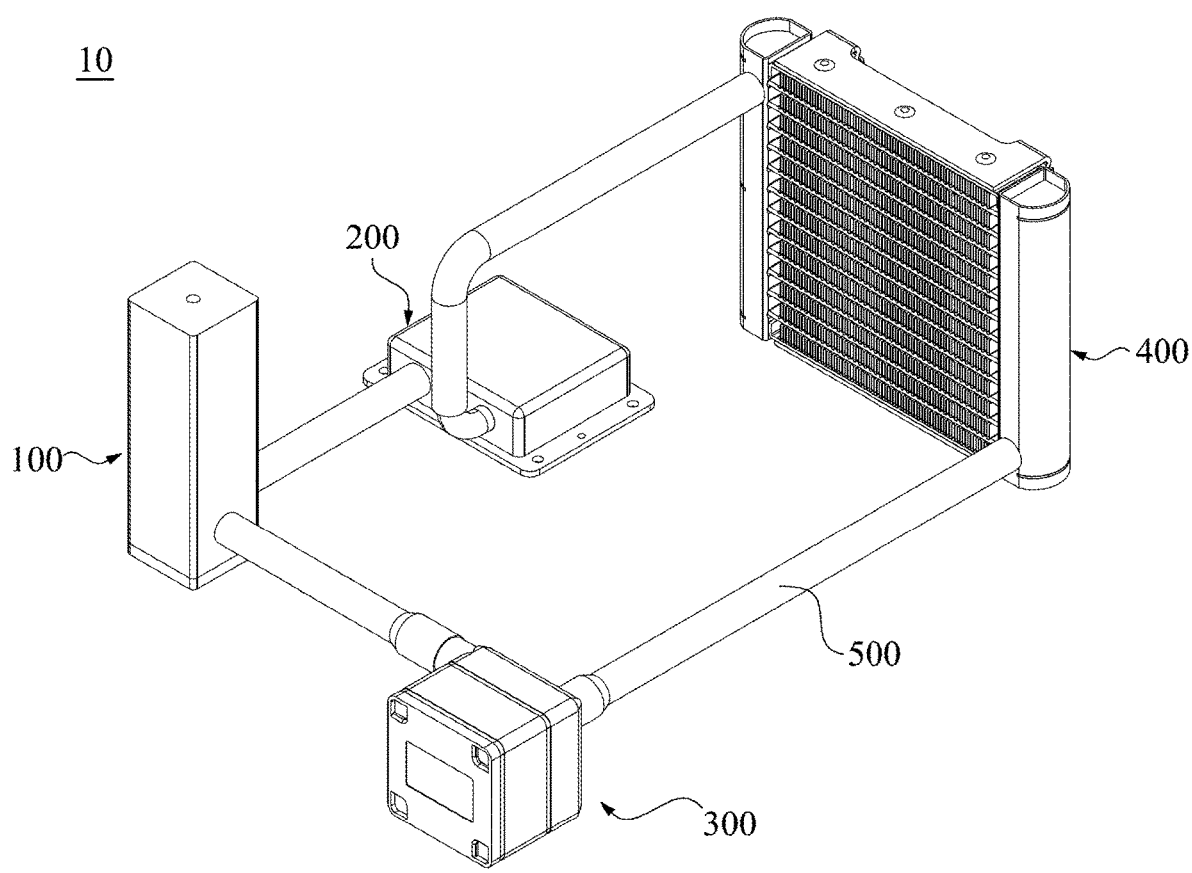
FIG. 1 is a schematic of a cooling system according to one embodiment of the present embodiment.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a cooling system 10 according to one embodiment of the present embodiment. As shown in FIG. 1, the cooling system 10 includes a liquid storage tank 100, a cold plate 200, a pump 300, a radiator 400, and at least a duct 500. The liquid storage tank 100, the cold plate 200, the radiator 400, and the pump 300 are connected through the duct 500. The duct 500 and the cold plate 200 have coolant therein. The pump 300 is used to force the coolant to circulate in the duct 500 so that the heat from the radiator 400 can be transferred by the coolant and the coolant can be cooled by flowing through the cold plate 200. The liquid storage tank 100 can refill the coolant that may reduce due to evaporation, thereby expanding the life time of the cooling system 10.

In the following description, structures of the liquid storage tank in multiple embodiments will be described in detail. It is noted that, the liquid storage tank may have an inlet pipe and an outlet pipe connecting two ducts (see FIG. 1), respectively, or the liquid storage tank may have only the outlet pipe but not the inlet pipe. For example, two ends of the duct can directly connect with the cold plate and the pump, and the outlet pipe of the liquid storage tank may connect with a portion of the duct, such as the center part of the duct.

Figure 2A:
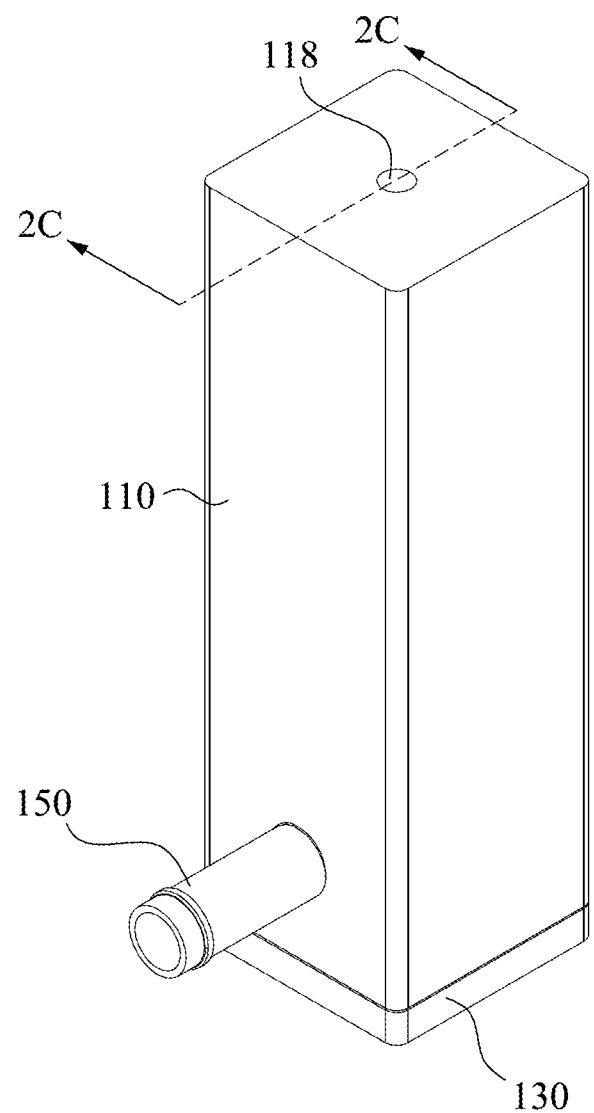
FIG. 2A is a perspective view of a liquid storage tank according to one embodiment of the present embodiment.
Figure 2B:
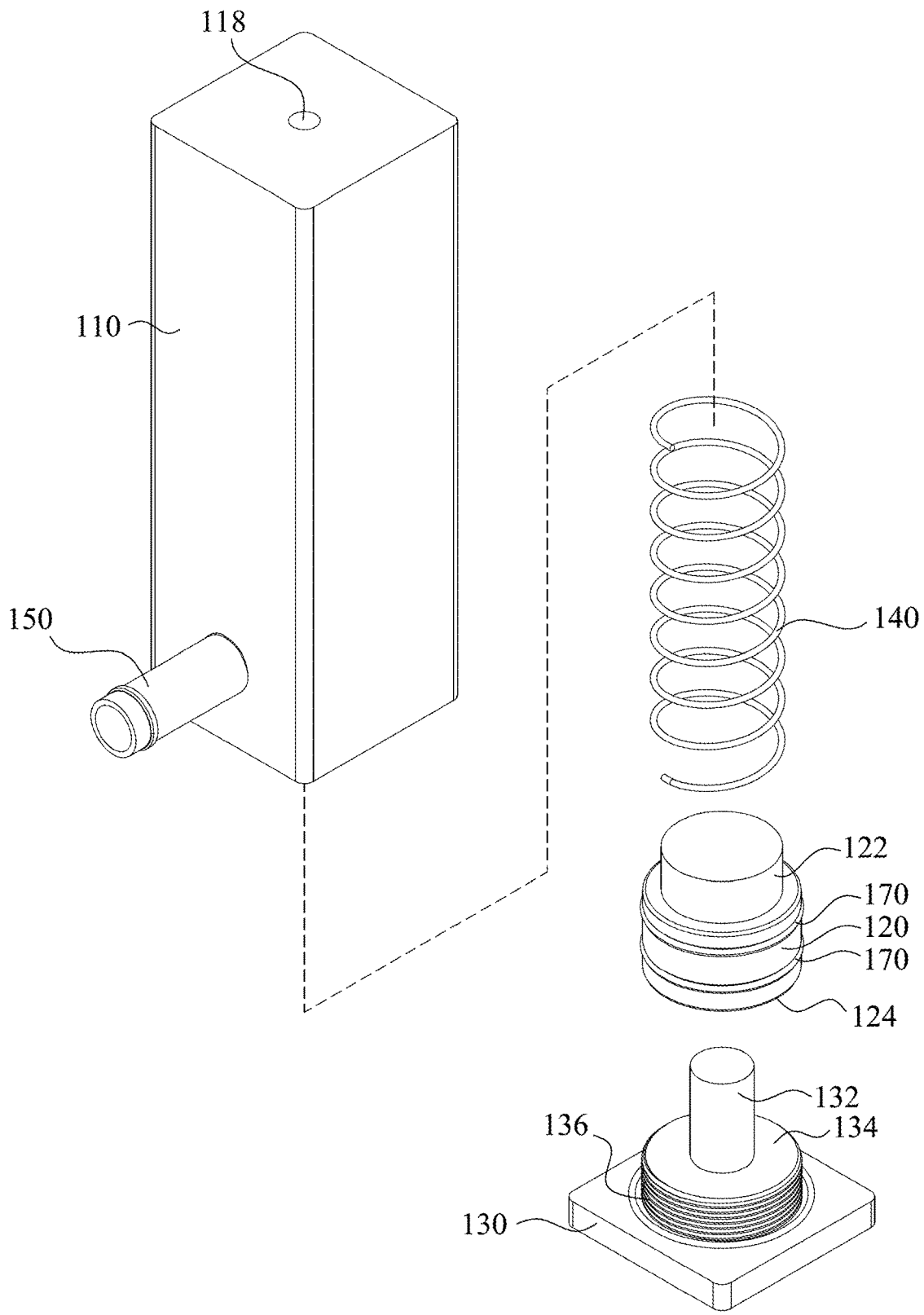
FIG. 2B is a exploded view of the liquid storage tank shown in FIG. 2A.
Figure 2C:
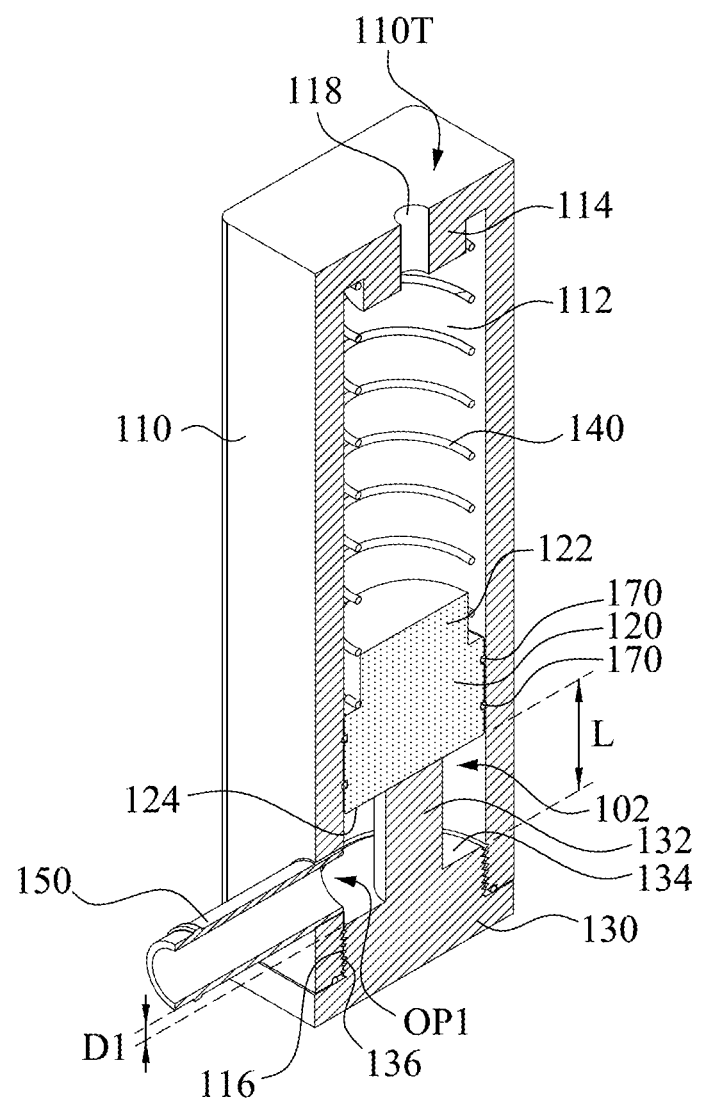
FIG. 2C is a perspective cross-sectional view taken along line 2C-2C shown in FIG. 2A.

FIG. 2A is a perspective view of a liquid storage tank 100 according to one embodiment of this invention. FIG. 2B is an exploded view of the liquid storage tank 100 shown in FIG. 2A. FIG. 2C is a perspective cross-sectional view taken along line 2C-2C shown in FIG. 2A. Referring to FIGS. 2A to 2C, the liquid storage tank 100 includes a housing 110, a piston 120, a cover 130, an elastic element 140, and an outlet pipe 150. The cover 130 is attached to the bottom side of the housing 110, and an inner side wall 112 of the housing 110 and the cover 130 form a space that can receive the piston 120 and the elastic element 140. In the present embodiment, an outer profile of the housing 110 is in rectangular shape, and the inner side wall 112 is cylindrical, but the present disclosure is not limited in this regard. The profile of the piston 120 is mated with the profile of the inner side wall 112 of the housing 110. The elastic element 140 is connected with the housing 110 and the piston 120 so that the piston 120 can move within the space formed by the inner side wall 112 of the housing 110 and the cover 130.

The piston 120, the housing 110, and the cover 130 define a tank chamber 102 for storing coolant. Specifically, the cover 130 has a surface 134 facing the piston 120, and the piston 120 has a surface 124 facing the cover 130. The tank chamber 102 is defined by the surface 134 of the cover 130, the surface 124 of the piston 120, and the inner side wall 112 of the housing 110. The outlet pipe 150 communicates the tank chamber 102. The tank chamber 102 and the piston 120 partially occupy the space formed by the housing 110 and the cover 130. In the present embodiment, the side wall of the housing 110 has an opening OP1, the outlet pipe 150 is connected with the side wall of the housing 110 through the opening OP1. In the present embodiment, the outlet pipe 150 may alternatively be connected with a duct 500 of which two sides are connected with any two of the cold plate 200, the radiator 400 and the pump 300, respectively.

As shown in FIG. 2C, in the present embodiment, the housing 110 has an upper portion 110T opposite to the cover 130 and a column 114, and the column 114 extends from the upper portion 110T toward the housing 110. The piston 120 further includes a rod 122, and the rod 122 extends toward the upper portion 110T of the housing 110. Two sides of the elastic element 140 are connected with and fixed on the column 114 and the rod 122, respectively. In the present embodiment, the elastic element 140 is a spring, but the present disclosure is not limited in this regard. When the tank chamber 102 is fully filled with water, the elastic element 140 is compressed, and the piston 120 may be close to the upper portion 110T of the housing 110. After the coolant circulates in the cooling system 10 for a long time, the coolant may reduce due to evaporation. The elastic recovery force of the elastic element 140 may push the piston 120 toward the cover 130 and compress the tank chamber 102 so that the coolant can be pushed out from the tank chamber 102 to the outlet pipe 150 through the opening OP1. Therefore, by pairing the elastic element 140 and the piston 120 so as to continuously compress the tank chamber 102, the coolant can be keep at a side close to the outlet pipe 150. In other words, the liquid storage tank 100 can supplement the coolant automatically and continuously. Thus, the setting orientation of the liquid storage tank 100 will not be limited.

In the present embodiment, the cover 130 has a support post 132 extending toward the piston 120. In other words, the support post 132 is located in the tank chamber 102. As shown in FIG. 2C, the support post 132 has a length L, the outlet pipe 150 and surface 134 of the cover 130 have a distance D1 therebetween, and the length L is greater than the distance D1. The distance D1 is a length between an edge of the opening OP1 close to the cover 130 and the surface 134 of the cover 130. When the piston 120 is abutted against the support post 132, the distance between the surface 124 of the piston 120 and the surface 134 of the cover 130 is equal to the length L of the support post 132, and the volume of the tank chamber 102 is in a minimal value. With such design, when the piston 120 is abutted against the support post 132, the piston 120 would not block the opening OP1 and the outlet pipe 150. In some other embodiments, the piston 120 may block a part of the opening OP1, but not obstruct the outlet pipe 150 so that the coolant can flow therein. That is, the support post 132 may limit the range of the movement of the piston 120 to prevent the piston 120 from being too close to the cover 130, thereby prevent the piston 120 from blocking off the outlet pipe 150 to maintain the communication between the tank chamber 102 and the outlet pipe 150.

In other words, as long as the volume of the coolant in the tank chamber 102 is greater than a product of the distance D1 and the cross-sectional area (that is the cross-sectional area of the cylinder formed by the inner side wall 112 in the FIG. 2C), then the liquid storage tank 100 can continuously supplement the coolant. In comparison with the conventional passive liquid supplement device that may fail to supplement the coolant when the volume of the coolant is less than half of the volume of the tank, the liquid storage tank 100 of the present disclosure can increase the available volume of the coolant in the liquid storage tank 100, such that it is not necessary to set the outlet pipe 150 in a center of the housing 110.

In the present embodiment, as shown in FIGS. 2B and 2C, the cover 130 has a screw thread 136, and the housing 110 has a screw thread 116. The screw thread 136 of the cover 130 and the screw thread 116 of the housing 110 are engaged with each other to fix the cover 130 to the housing 110.

In the present embodiment, the housing 110 further includes an air vent 118 communicating the space formed by the housing 110 and the cover 130. When the piston 120 is gradually close to the cover 130 and the tank chamber 102 is compressed, the pressure between the upper portion 110T of the housing 110 and the piston 120 is gradually decreased, which make it difficult for the elastic element 140 to push the piston 120. Therefore, by setting the air vent 118, the pressure in the housing 110 can be balanced, such that the elastic element 140 can continuously push the piston 120 by the elastic recovery force. In the present embodiment, the air vent 118 is located at the upper portion 110T, but the present disclosure is not limited in this regard, as long as the air vent 118 can balance the pressure of the space between the upper portion 110T of the housing 110 and the piston 120.

In some embodiments, the liquid storage tank 100 further includes an o ring 170. The O ring 170 surrounds the piston 120 and is located between the housing 110 and the piston 120, such that the o ring 170 can fill the gap between the piston 120 and the inner side wall 112 of the housing 110. In the present embodiment, the number of the o ring is two, but the present disclosure is not limited in this regard.

Figure 3:
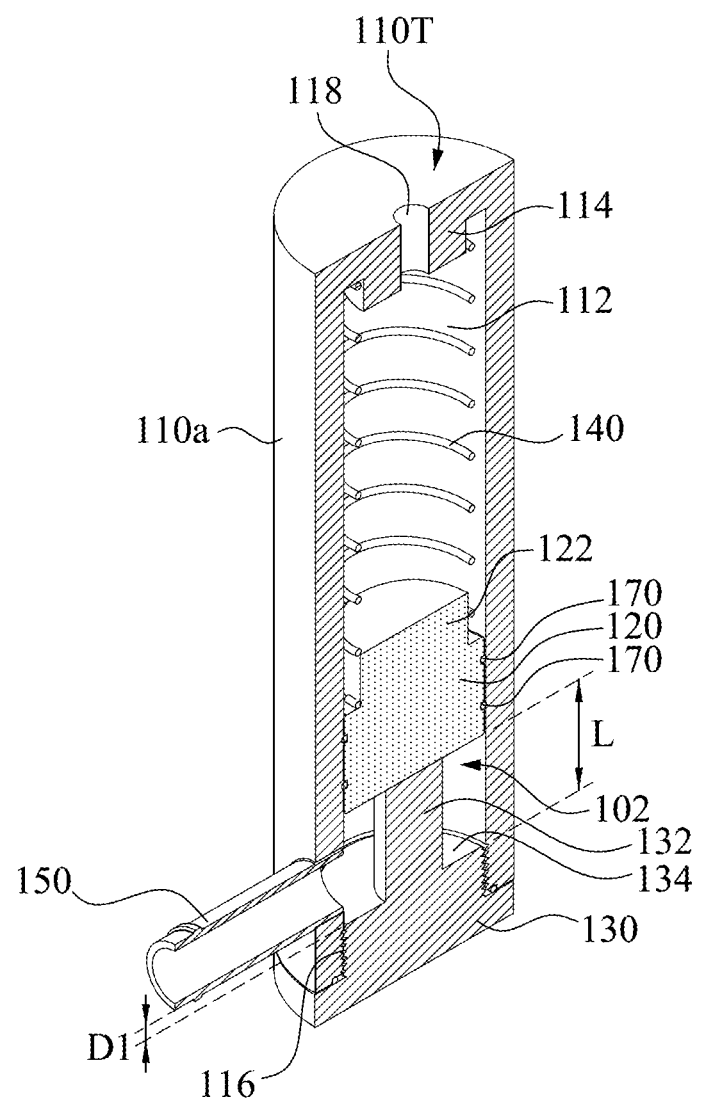
FIG. 3 is a perspective cross-sectional view according to another embodiment of the present embodiment.

FIG. 3 is a perspective cross-sectional view of a liquid storage tank 100a according to another embodiment of the present embodiment. The liquid storage tank 100a is substantially the same as the liquid storage tank 100 in FIGS. 2A to 2C, and the difference is that the housing 110a of the liquid storage tank 100a has a cylindrical outer profile. The liquid storage tank 100a has the same advantages as the liquid storage tank 100, therefore the description will not be repeated hereinafter.

Figure 4:
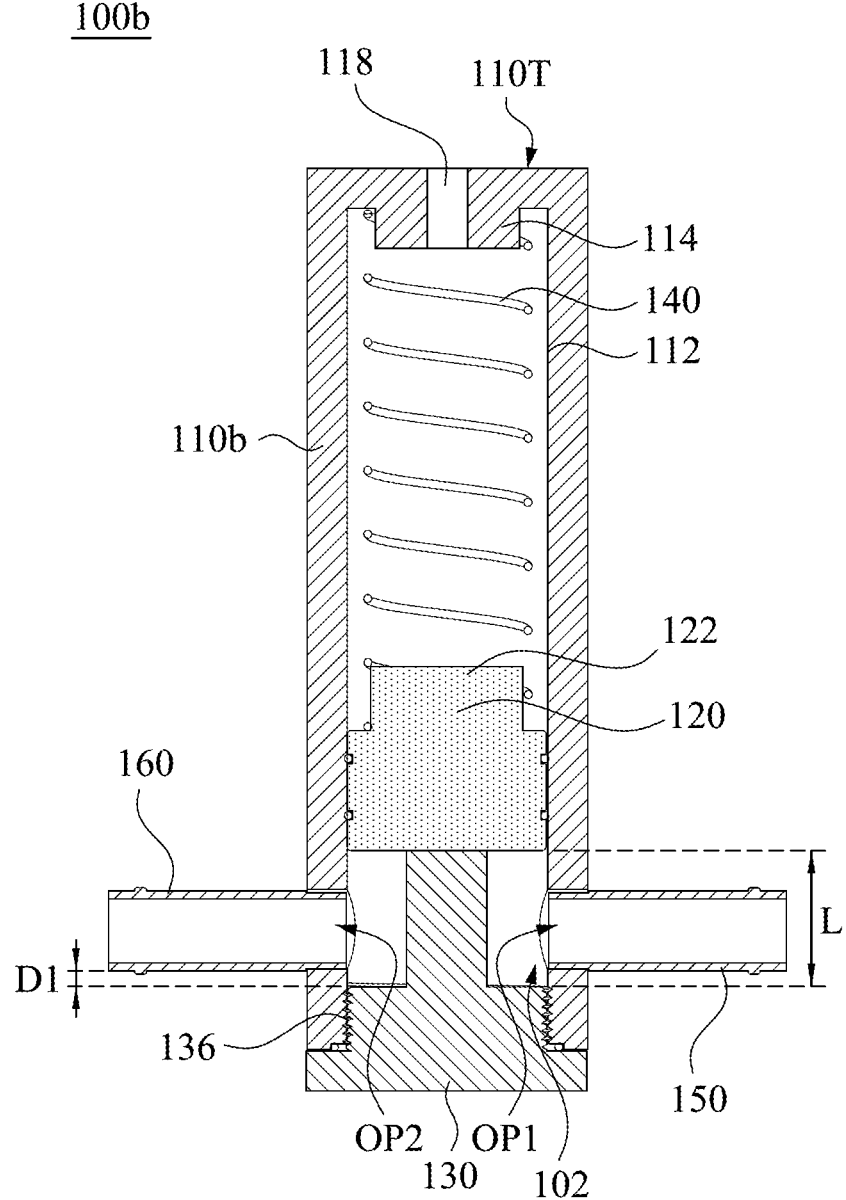
FIG. 4 is a cross-sectional view of a liquid storage tank according to another embodiment of the present embodiment.

FIG. 4 is a cross-sectional view of a liquid storage tank 100b according to another embodiment of the present embodiment. The liquid storage tank 100b shown in FIG. 4 is substantially the same as the liquid storage tank 100 shown in FIG. 2C, and the difference is that the housing 110b further includes an inlet pipe 160 communicating the tank chamber 102. In the present embodiment, the housing 110b further includes an opening OP2 configured to connect the inlet pipe 160. The outlet pipe 150 and the inlet pipe 160 can connect to the cold plate 200 and the pump 300, respectively, through ducts 500. The setting orientation of the outlet pipe 150 and the inlet pipe 160 can be opposite to each other or form arbitrary angle (as shown in FIG. 1), as long as they can respectively connect the cold plate 200 and the pump 300. The liquid storage tank 100b has the same advantages as the liquid storage tank 100, and the description will not be repeated hereinafter.

Figure 5:
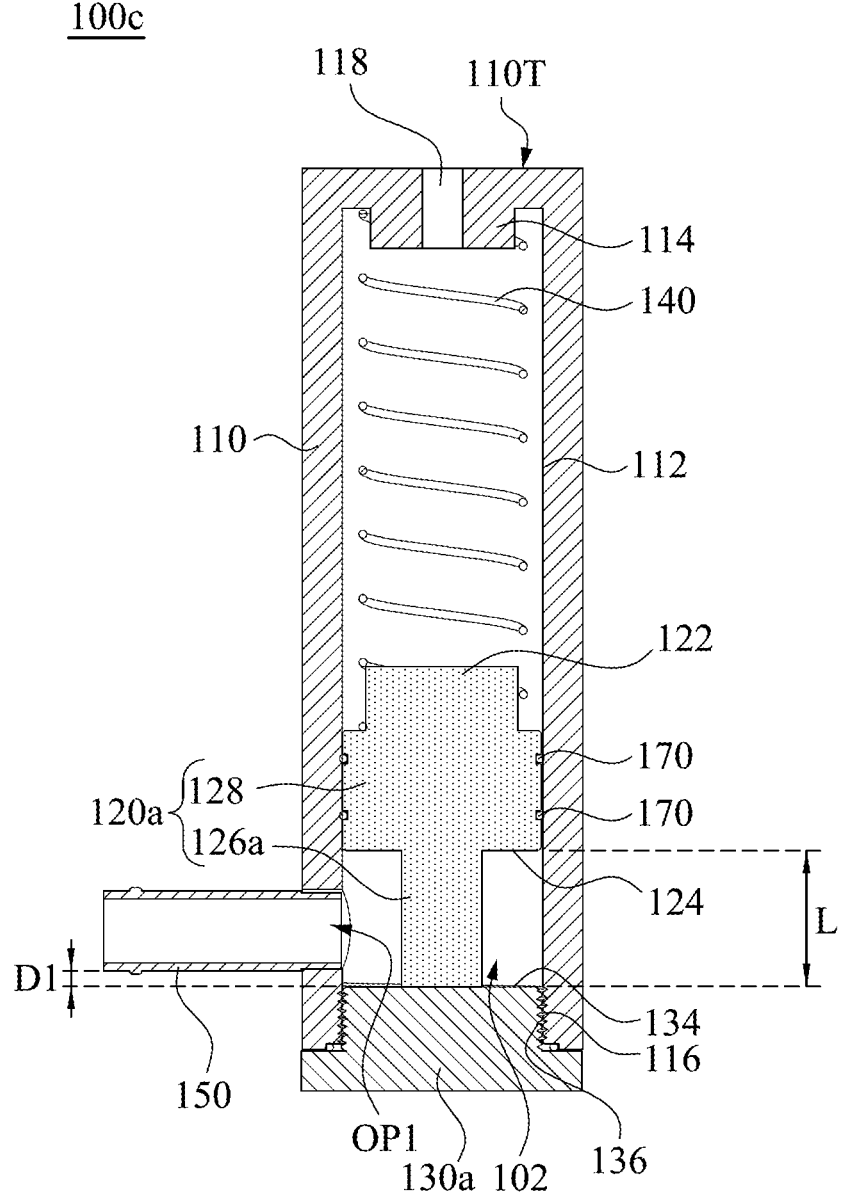
FIG. 5 is a cross-sectional view of a liquid storage tank according to another embodiment of the present embodiment.

FIG. 5 is a cross-sectional view liquid storage tank 100c according to another embodiment of the present embodiment. The liquid storage tank 100c includes a housing 110, a piston 120a, a cover 130a, an elastic element 140, and an outlet pipe 150. The cover 130a is attached to the housing 110, and an inner side wall 112 of the housing 110 and the cover 130a form a space that can receive the piston 120a and the elastic element 140. The profile of the piston 120a is mated with the profile of the inner side wall 112 of the housing 110. The elastic element 140 is connected with the housing 110 and the piston 120a such that the piston 120a can move within the space formed by the inner side wall 112 of the housing 110 and the cover 130a.

The piston 120a, the housing 110, and the cover 130a define a tank chamber 102 for storing coolant. Specifically, the cover 130a has a surface 134 facing the piston 120a, and the piston 120a has a surface 124 facing the cover 130a. The tank chamber 102 is defined by the surface 134 of the cover 130a, the surface 124 of the piston 120a, and the inner side wall 112 of the housing 110. The outlet pipe 150 communicates the tank chamber 102. In the present embodiment, the side wall of the housing 110 has an opening OP1, the outlet pipe 150 is connected with the side wall of the housing 110 through the opening OP1. The piston 120a includes a body portion 128 and a support post 126a extending toward the cover 130a. In other words, the support post 126a protrudes from the body portion 128 and is located in the tank chamber 102. As shown in FIG. 5, the support post 126a has a length L, the outlet pipe 150 and surface 134 of the cover 130a have a distance D1 therebetween, and the length L is greater than the distance D1.

In the present embodiment, the housing 110 has an upper portion 110T opposite to the cover 130a and a column 114, and the column 114 extends from the upper portion 110T toward the housing 110. The piston 120a further includes a rod 122, and the rod 122 extends toward the upper portion 110T of the housing 110. Two sides of the elastic element 140 are connected with and fixed on the column 114 and the rod 122, respectively. In the present embodiment, the elastic element 140 is a spring, but the present disclosure is not limited in this regard. When the liquid storage tank 100c is fully filled with water, the elastic element 140 is compressed, and the piston 120 may be close to the upper portion 110T of the housing 110. After the coolant circulates in the cooling system 10 for a long time, the coolant may reduce due to evaporation. The elastic recovery force of the elastic element 140 may push the piston 120a toward the cover 130a and compress the tank chamber 102 so that the coolant can be pushed out from the tank chamber 102 to the outlet pipe 150. In other words, the liquid storage tank 100c can supplement the coolant automatically and continuously, and the setting orientation of the liquid storage tank 100c will not be limited.

When the support post 126a of the piston 120 is abutted against the cover 130a, the distance between the surface 124 of the piston 120a and the surface 134 of the cover 130a is equal to the length L of the support post 126a, and the volume of the tank chamber 102 is in a minimal value. In some embodiments, when the support post 126a of the piston 120a is abutted against the cover 130a, the body portion 128 of the piston 120a would not block the opening OP1 and the outlet pipe 150. In some other embodiments, the body portion 128 of the piston 120a may block a part of the opening OP1, but not obstruct the outlet pipe 150 so that the coolant can flow therein. That is, the support post 126a may limit the range of the movement of the body portion 128 of the piston 120a to prevent the body portion 128 from being too close to the cover 130a, thereby prevent the piston 120a from blocking off the outlet pipe 150 to maintain the communication between the tank chamber 102 and the outlet pipe 150.

In other words, as long as the volume of the coolant in the tank chamber 102 is greater than a product of the distance D1 and the cross-sectional area (that is the cross-sectional area of the cylinder formed by the inner side wall 112), then the liquid storage tank 100c can continuously supplement the coolant. In comparison with the conventional passive liquid supplement device that may fail to supplement the coolant when the volume of the coolant is less than half of the volume of the tank, the liquid storage tank 100c of the present disclosure can increase the available volume of the coolant in the liquid storage tank 100c, such that it is not necessary to set the outlet pipe 150 in a center of the housing 110.

The cover 130a has a screw thread 136, the housing 110 has a screw thread 116. The screw thread 136 of the cover 130 and the screw thread 116 of the housing 110 are engaged with each other to fix the cover 130a to the housing 110, so that the cover 130a and the housing 110 can form a space that can receive the piston 120a and the elastic element 140. The housing 110 further includes an air vent 118 communicating the space formed by the housing 110 and the cover 130a. The liquid storage tank 100c further includes an o ring 170. The O ring 170 surrounds the piston 120a and is located between the housing 110 and the piston 120a. The description and the advantages of those structures are the same as described about the liquid storage tank 100 shown in FIGS. 2A to 2C, and the description will not be repeated hereinafter.

Figure 6:
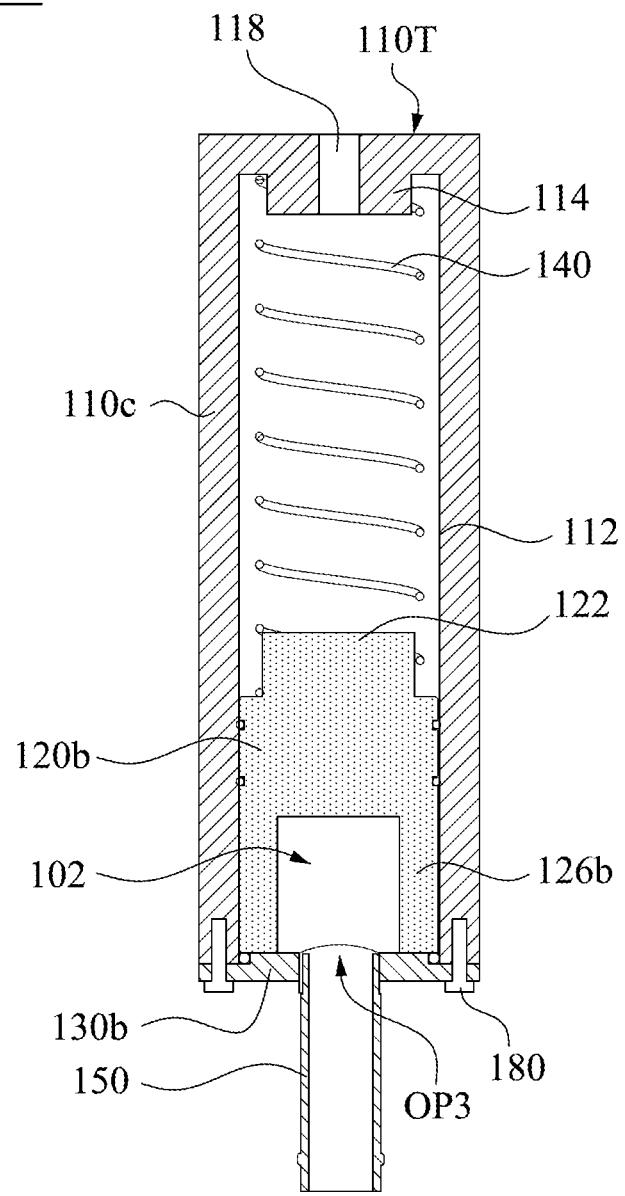
FIG. 6 is a cross-sectional view of a liquid storage tank according to another embodiment of the present embodiment.

FIG. 6 is a cross-sectional view of a liquid storage tank 100d according to another embodiment of the present embodiment. The liquid storage tank 100d is substantially the same as the liquid storage tank 100c shown in FIG. 5, the difference is that the outlet pipe 150 of the liquid storage tank 100d is connected with the cover 130b, and the support post 126b of the piston 120b extends toward the cover 130b along the of the rim of the piston 120b. As shown in FIG. 6, the housing 110c has no opening, the cover 130b of the liquid storage tank 100d has an opening OP3, and the outlet pipe 150 of the liquid storage tank 100d is connected with the opening OP3 of the cover 130b. In some embodiments, the support post 126b of the piston 120b can be a annular structure that extend along the inner side wall 112, or multiple independent support posts 126b, as long as the outlet pipe 150 are not blocked. As shown in FIG. 6, the liquid storage tank 100d further includes a retaining element 180 passing through the cover 130b and fixed to the housing 110c. In the present embodiment, the retaining element 180 can be a screw, but the present disclosure is not limited in this regard. The liquid storage tank 100d has the same advantages as the liquid storage tank 100d, and the description will not be repeated hereinafter.

Figure 7:
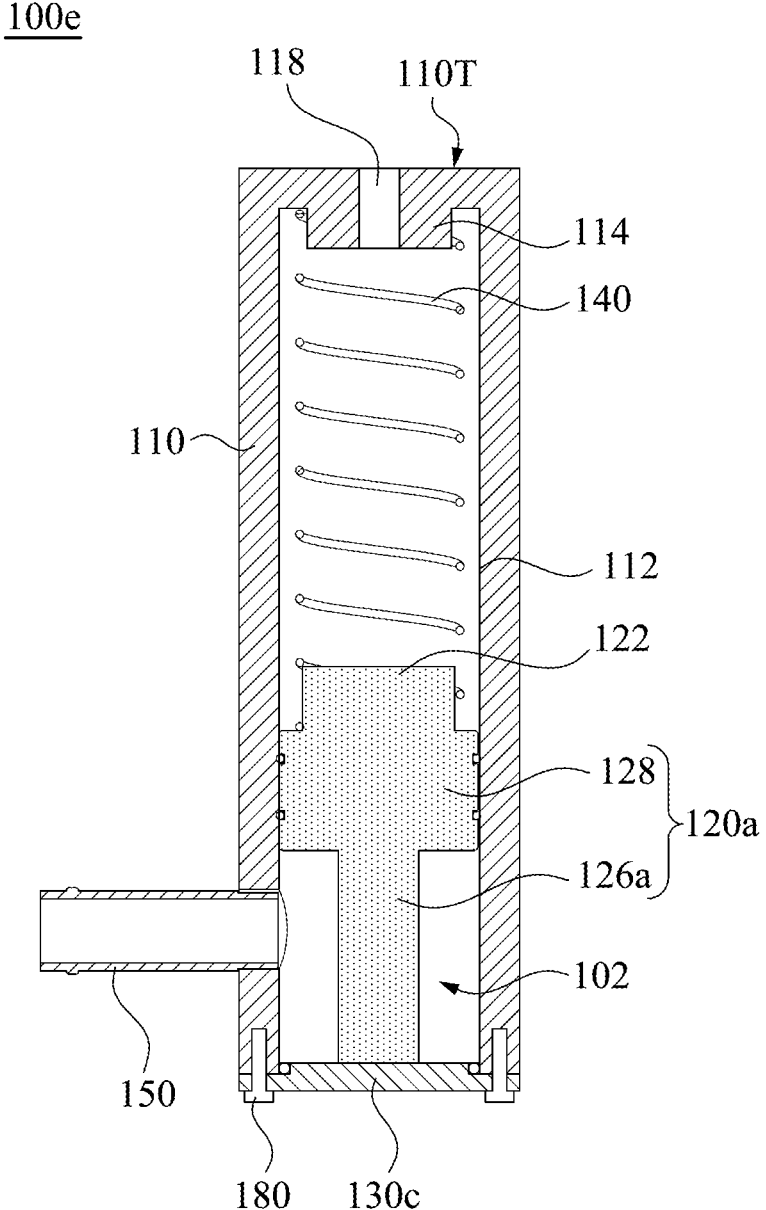
FIG. 7 is a cross-sectional view of a liquid storage tank according to another embodiment of the present embodiment.

FIG. 7 is a cross-sectional view of a liquid storage tank 100e according to another embodiment of the present embodiment. The liquid storage tank 100e is substantially the same as the liquid storage tank 100c shown in FIG. 5, the difference is that the cover 130c of the liquid storage tank 100e is fixed to the housing 100 through the retaining element 180. The liquid storage tank 100e has the same advantages as the liquid storage tank 100c, and the description will not be repeated hereinafter.

Figure 8:
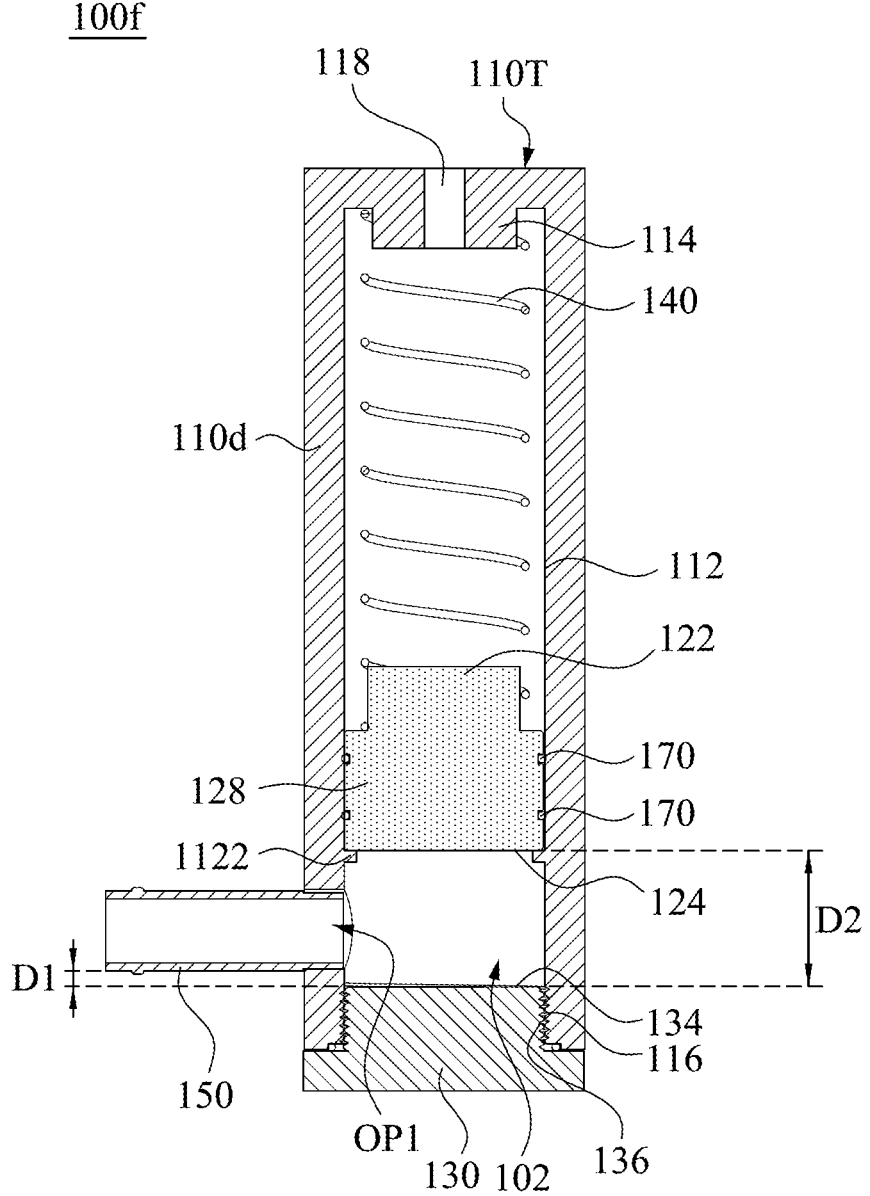
FIG. 8 is a cross-sectional view of a liquid storage tank according to another embodiment of the present embodiment.

FIG. 8 is a cross-sectional view of a liquid storage tank 100f according to another embodiment of the present embodiment. The liquid storage tank 100f includes a housing 110d, a piston 120, a cover 130, an elastic element 140, and an outlet pipe 150. The housing 110d has an inner side wall 112 and a protrusion 1122 extending from the inner side wall 112. The cover 130 is attached to the housing 110d, and the inner side wall 112 of the housing 110d and the cover 130 form a space that can receive the piston 120 and the elastic element 140. The profile of the piston 120 is mated with the profile of the inner side wall 112 of the housing 110d. The elastic element 140 is connected with the housing 110d and the piston 120 so that the piston 120 can move within the space formed by the inner side wall 112 of the housing 110*d* and the cover 130.

The piston 120, the housing 110*d*, and the cover 130 define a tank chamber 102 for storing coolant. Specifically, the cover 130 has a surface 134 facing the piston 120, and the piston 120 has a surface 124 facing the cover 130. The tank chamber 102 is defined by the surface 134 of the cover 130, the surface 124 of the piston 120, and the inner side wall 112 of the housing 110. The outlet pipe 150 communicates the tank chamber 102. In the present embodiment, the side wall of the housing 110*d* has an opening OP1, the outlet pipe 150 is connected with the side wall of the housing 110 through the opening OP1. The protrusion 1122 and the surface 134 of the cover 130 has a distance D2 therebetween, the outlet pipe 150 and the surface 134 of the cover 130 has a distance D1 therebetween, and the distance D2 is greater than the distance D1.

As shown in FIG. 8, in the present embodiment, the housing 110*d* has an upper portion 110T opposite to the cover 130 and a column 114, and the column 114 extends from the upper portion 110T toward the housing 110*d*. The piston 120 further includes a rod 122, and the rod 122 extends toward the upper portion 110T of the housing 110*d*. Two sides of the elastic element 140 are connected with and fixed on the column 114 and the rod 122, respectively. In the present embodiment, the elastic element 140 is a spring. When the liquid storage tank 100 is fully filled with water, the elastic element 140 is compressed, and the piston 120 may be close to the upper portion 110T of the housing 110. After the coolant circulates in the cooling system 10 for a long time, the coolant may reduce due to evaporation. The elastic recovery force of the elastic element 140 may push the piston 120 toward the cover 130 and compress the tank chamber 102 such that the coolant can be pushed out from the tank chamber 102 to the outlet pipe 150. In other words, the liquid storage tank 100*f* can supplement the coolant automatically and continuously.

In some embodiment, the protrusion 1122 can be a annular structure protruding along the inner side wall 112, or multiple independent protrusions, as long as the piston 120 can be stopped by the protrusion. When the piston 120 is abutted against the protrusion 1122, the distance between the surface 124 of the piston 120 and the surface 134 of the cover 130 is equal to the distance D2, and the volume of the tank chamber 102 is in a minimal value. In some embodiments, when the piston 120 is abutted against the protrusion 1122, the piston 120 would not block the opening OP1 and the outlet pipe 150. In some other embodiments, the piston 120 may block a part of the opening OP1, but not obstruct the outlet pipe 150 such that the coolant can flow therein. That is, the protrusion 1122 may limit the range of the movement of the piston 120 to prevent the piston 120 from being too close to the cover 130, thereby prevent the piston 120 from blocking off the outlet pipe 150 to maintain the communication between the tank chamber 102 and the outlet pipe 150.

In other words, as long as the volume of the coolant in the tank chamber 102 is greater than a product of the distance D1 and the cross-sectional area (that is the cross-sectional area of the cylinder formed by the inner side wall 112), then the liquid storage tank 100*f* can continuously supplement the coolant. In comparison with the conventional passive liquid supplement device that may fail to supplement the coolant when the volume of the coolant is less than half of the volume of the tank, the liquid storage tank 100*f* of the present disclosure can increase the available volume of the coolant in the liquid storage tank 100*f*, such that it is not necessary to set the outlet pipe 150 in a center of the housing 110*d*.

The cover 130 has a screw thread 136, the housing 110*d* has a screw thread 116. The screw thread 136 of the cover 130 and the screw thread 116 of the housing 110 are engaged with each other to fix the cover 130 to the housing 110*d*, but the present disclosure is not limited in this regard, as long as the cover 130 and the housing 110*d* can form a space that can receive the piston 120 and the elastic element 140. The housing 110*d* further includes an air vent 118 communicating the space formed by the housing 110*d* and the cover 130. The liquid storage tank 100*f* further includes an o ring 170. The O ring 170 surrounds the piston 120 and is located between the housing 110*d* and the piston 120. The description and the advantages of those structures are the same as described about the liquid storage tank 100 shown in FIGS. 2A to 2C, and the description will not be repeated hereinafter.

Figure 9:
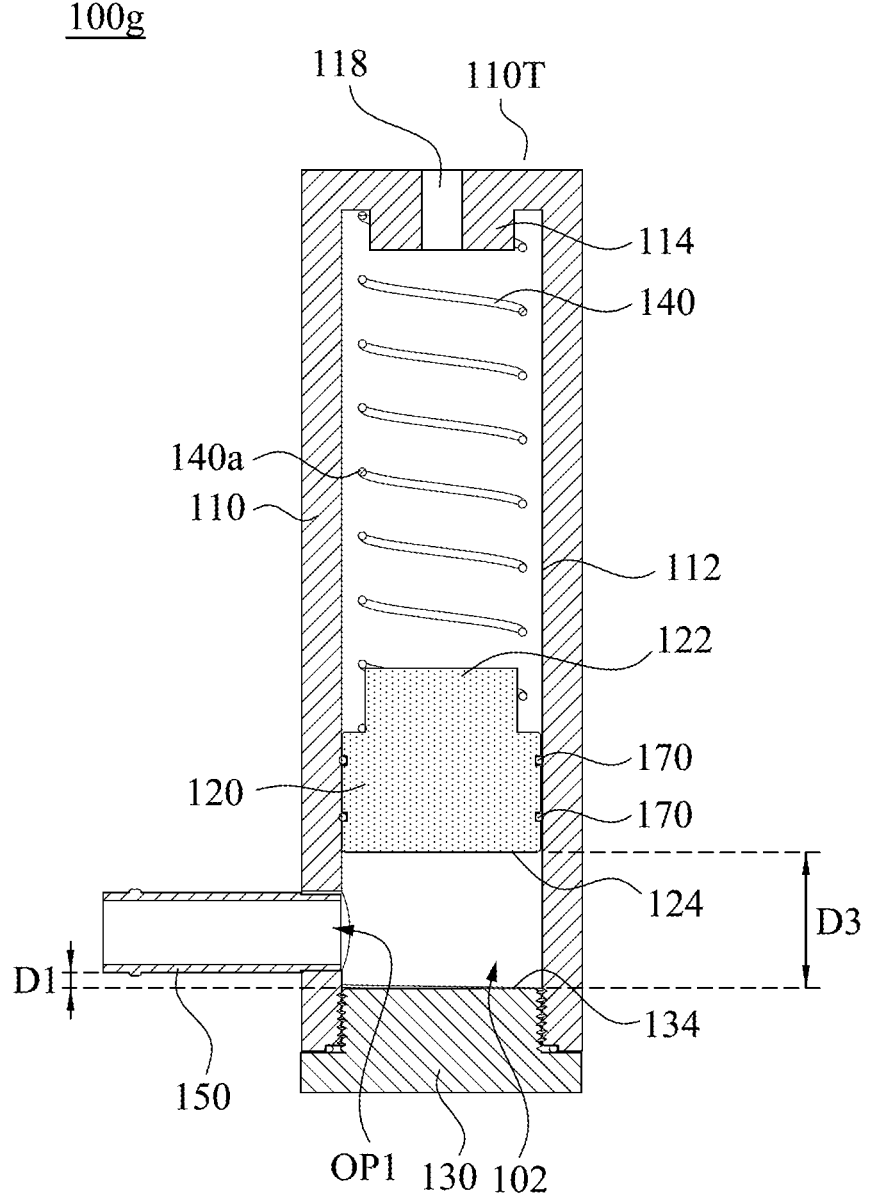
FIG. 9 is a cross-sectional view of a liquid storage tank according to another embodiment of the present embodiment.

FIG. 9 is a cross-sectional view of a liquid storage tank 100*g* according to another embodiment of the present embodiment. The liquid storage tank 100*g* is substantially the same as the liquid tank 110*f* shown in FIG. 8, and the difference is that no protrusion 1122 is extending from the inner side wall 112 of the housing 110.

In the present embodiment, the elastic element 140*a* is a spring, but the present disclosure is not limited in this regard. When the liquid storage tank 100 is fully filled with water, the elastic element 140*a* is compressed, and the piston 120 may be close to the upper portion 110T of the housing 110. After the coolant circulates in the cooling system 10 for a long time, the coolant may reduce due to evaporation. The elastic recovery force of the elastic element 140*a* may push the piston 120 toward the cover 130 and compress the tank chamber 102 such that the coolant can be pushed out from the tank chamber 102 to the outlet pipe 150.

The surface 124 of the piston 120 and the surface 134 of the cover 130 have a distance D3 therebetween, the surface 134 of the cover 130 and the outlet pipe 150 have a distance D1 therebetween, and the distance D3 is greater than the distance D1. In the present embodiment, the elastic element 140*a* is specially designed to keep a gap between the piston 120 and the cover 130 greater than the distance D1 when the elastic element 140*a* is not compressed. That is, when the volume of the tank chamber 102 is in a minimal value, the elastic recovery force of the elastic element 140*a* is equal to zero. The advantages of the liquid storage tank 100*g* shown in FIG. 9 are the same as described about the liquid storage tank 100 shown in FIG. 2A to FIG. 2C, and the description will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A liquid storage tank, comprising:
a housing;
a piston in the housing;
a cover attached to the housing and comprising a support post that extends toward the piston, the cover comprising a surface facing toward the piston, wherein the piston, the housing, and the cover define a tank chamber, and the tank chamber is filled with cooling liquid;
an elastic element connected with the housing and the piston, and the elastic element is free from contact with the cooling liquid; and
an outlet pipe communicating with the tank chamber, wherein an extension direction of an opening of the outlet pipe is not parallel to a direction of movement of the elastic element, a distance between the outlet pipe and the surface of the cover is less than a length of the support post;
wherein when the cooling liquid is decreased, the piston compressed the tank chamber such that the elastic element is released, and the tank chamber is continuously compressed by pairing the elastic element and the piston.

2. The liquid storage tank of claim 1, wherein a length of the support post is greater than a distance between the outlet pipe and the cover.

3. The liquid storage tank of claim 1, wherein the housing further comprises a column, the piston further comprises a rod, and two ends of the elastic element are connected with the column and the rod, respectively.

4. The liquid storage tank of claim 1, further comprising: an inlet pipe communicating with the tank chamber.

5. The liquid storage tank of claim 1, wherein the housing further comprises an upper portion opposite to the cover, and the upper portion has an air vent therein.

6. The liquid storage tank of claim 1, wherein the cover and the housing each comprises a screw thread, and the two screw threads are engaged with each other.

7. The liquid storage tank of claim 1, further comprising: an o ring surrounding the piston and located between the housing and the piston.

8. The liquid storage tank of claim 1, wherein a length of the support post is greater than a distance between the outlet pipe and the cover.

9. A liquid storage tank, comprising:
a housing;
a cover attached to the housing;
a piston in the housing and comprising a support post that extends toward the cover, wherein the piston, the housing, and the cover define a tank chamber, and the tank chamber is filled with cooling liquid, wherein the cover comprises a surface facing toward the piston;
an elastic element connected with the housing and the piston, and the elastic element is free from contact with the cooling liquid; and
an outlet pipe communicating with the tank chamber, wherein an extension direction of an opening of the outlet pipe is not parallel to a direction of movement of the elastic element, a distance between the outlet pipe and the surface of the cover is less than a length of the support post;
wherein when the cooling liquid is decreased, the piston compressed the tank chamber such that the elastic element is released, and the tank chamber is continuously compressed by pairing the elastic element and the piston.

10. The liquid storage tank of claim 9, wherein the outlet pipe is connected with a sidewall of the housing.

11. The liquid storage tank of claim 9, wherein the outlet pipe is connected with the cover.

12. The liquid storage tank of claim 9, wherein the cover and the housing each comprises a screw thread, and the two screw threads are engaged with each other.

13. The liquid storage tank of claim 9, further comprising:
a retaining element passing through the cover and fixed to the housing.

14. A liquid storage tank, comprising:
a housing comprising an inner side wall and a protrusion extending from the inner side wall;
a cover attached to the housing;
a piston in the housing, wherein the piston, the housing, and the cover define a tank chamber, and the tank chamber is filled with cooling liquid, wherein the housing comprises a column facing toward the piston, and a distance between the column and the inner side wall of the housing is greater than a length of the protrusion extending within the chamber away from the inner side wall of the housing;
an elastic element connected with the housing and the piston, and the elastic element is free from contact with the cooling liquid; and
an outlet pipe communicating with the tank chamber, wherein an extension direction of an opening of the outlet pipe is not parallel to a direction of movement of the elastic element;
wherein when the cooling liquid is decreased, the piston compressed the tank chamber such that the elastic element is released, and the tank chamber is continuously compressed by pairing the elastic element and the piston.

15. The liquid storage tank of claim 14, wherein a distance between the protrusion and the cover is greater than a distance between the cover and the outlet pipe.

16. The liquid storage tank of claim 14, wherein the cover and the housing each comprises a screw thread, and the two screw threads are engaged with each other.

17. The liquid storage tank of claim 14, further comprising:
a retaining element passing through the cover and fixed to the housing.

* * * * *